United States Patent
Riley et al.

(10) Patent No.: US 10,068,310 B2
(45) Date of Patent: Sep. 4, 2018

(54) BOWTIE VIEW REPRESENTING A 360-DEGREE IMAGE

(71) Applicant: Microsoft Technology Licensing, LLC, Redmond, WA (US)

(72) Inventors: Raymond Walter Riley, Bainbridge Island, WA (US); Kae-Ling Gurr, Seattle, WA (US); Brett Delainey Christie, Seattle, WA (US); Joshua D. Maruska, Seattle, WA (US); Joshua Noble, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 15/071,134

(22) Filed: Mar. 15, 2016

(65) Prior Publication Data

US 2017/0270633 A1  Sep. 21, 2017

(51) Int. Cl.
  *G06T 19/20* (2011.01)
  *G06T 3/00* (2006.01)
  *G06T 15/20* (2011.01)

(52) U.S. Cl.
  CPC ............ *G06T 3/0018* (2013.01); *G06T 15/20* (2013.01); *G06T 19/20* (2013.01)

(58) Field of Classification Search
  None
  See application file for complete search history.

(56) References Cited

U.S. PATENT DOCUMENTS

| | | | |
|---|---|---|---|
| 6,795,113 B1 * | 9/2004 | Jackson | G08B 13/19626 348/143 |
| 7,382,399 B1 * | 6/2008 | McCall | H04N 5/2254 348/207.99 |
| 8,111,282 B2 | 2/2012 | Cutler et al. | |
| 8,355,041 B2 * | 1/2013 | Chen | H04N 5/23238 348/14.12 |
| 8,537,196 B2 | 9/2013 | Hegde et al. | |
| 8,624,955 B2 | 1/2014 | Watson et al. | |
| 8,670,018 B2 | 3/2014 | Cunnington et al. | |

(Continued)

FOREIGN PATENT DOCUMENTS

WO  9847291 A2  10/1998

OTHER PUBLICATIONS

"Integrating the Polycom CX5000 with Polycom Video Systems", In White Paper of Polycom, Apr. 2009, pp. 1-18.

(Continued)

*Primary Examiner* — Ryan M Gray
(74) *Attorney, Agent, or Firm* — Wade IP Law LLC

(57) ABSTRACT

Techniques are described herein that are capable of providing a bowtie view of an environment. A bowtie view of an environment is a representation of a 360-degree image of the environment that is compressed at its center such that at least one side of the bowtie view is concave. For example, two opposing sides of the bowtie view may be concave. In accordance with this example, the two opposing sides may be top and bottom sides of the bowtie view. The 360-degree image is unwrapped to provide a flattened image. The flattened image is projected on an inner surface of a virtual object in a three-dimensional virtual environment. A portion of the flattened image is captured from the inner surface of the virtual object using a virtual camera to provide the bowtie view.

24 Claims, 6 Drawing Sheets

(56) References Cited

U.S. PATENT DOCUMENTS

| | | | |
|---|---|---|---|
| 8,798,252 B2 | 8/2014 | Krantz et al. | |
| 9,392,167 B2 * | 7/2016 | Shohara | G06T 15/205 |
| 2002/0122113 A1 * | 9/2002 | Foote | G06T 3/4038 |
| | | | 348/48 |
| 2003/0058368 A1 * | 3/2003 | Champion | G06T 1/60 |
| | | | 348/581 |
| 2003/0095131 A1 * | 5/2003 | Rondinelli | G06T 3/0062 |
| | | | 345/582 |
| 2004/0254982 A1 | 12/2004 | Hoffman et al. | |
| 2005/0025313 A1 * | 2/2005 | Wachtel | G06T 1/0007 |
| | | | 380/54 |
| 2009/0210789 A1 | 8/2009 | Thakkar et al. | |
| 2009/0220065 A1 | 9/2009 | Ahuja et al. | |
| 2012/0079399 A1 | 3/2012 | Ferman et al. | |
| 2013/0169742 A1 | 7/2013 | Wu et al. | |
| 2014/0104374 A1 | 4/2014 | Buckler | |
| 2014/0118472 A1 | 5/2014 | Liu et al. | |
| 2014/0169699 A1 * | 6/2014 | Li | G06T 3/00 |
| | | | 382/285 |
| 2014/0176542 A1 | 6/2014 | Shohara et al. | |
| 2015/0049162 A1 | 2/2015 | Kurupacheril et al. | |
| 2015/0179186 A1 | 6/2015 | Swierk et al. | |
| 2015/0244986 A1 | 8/2015 | Su | |

OTHER PUBLICATIONS

"Circular Segment" [online], Wikipedia [Retrieved on Mar. 10, 2016], Retrieved from the Internet: <URL: http://en.wikipedia.org/wiki/Circular_segment>, 2 pages.

"International Search Report and Written Opinion Issued in PCT Application No. PCT/US2017/021227", dated Jul. 6, 2017, 14 Pages.

* cited by examiner

BOWTIE VIEW REPRESENTING A 360-DEGREE IMAGE

BACKGROUND 360-degree video systems have become increasingly popular in recent years. A 360-degree video system includes a 360-degree video camera that captures a 360-degree image of an environment. The 360-degree video system may provide access to the 360-degree image through the Internet for display on remote viewers' personal computers, for example.

One example type of environment in which 360-degree video systems have been used is a video conferencing environment. For instance, a 360-degree video system may be incorporated into a video conferencing system, which enables participants of a video conference who are at different locations to communicate using two-way video and audio transmissions. The video conference may be hosted by participants in a conference room (a.k.a. in-room participants) in which a 360-degree video camera is located, and the video conferencing system may enable the in-room participants to communicate in real-time with other participants (e.g., remote participants) who are not in the conference room. The 360-degree video camera captures images of the in-room participants, which may be shown on displays of the other participants' computers to facilitate communication between the in-room participants and the other participants.

Images that are provided by a conventional 360-degree video system typically are distorted representations of the environment in which the 360-degree camera is located. For instance, the images often are fish-eye representations of the environment. Techniques have been proposed for compensating for such a fish-eye representation. However, such techniques typically introduce other distortions into the images (e.g., causing the shape of the table on which the 360-degree camera is placed to appear distorted).

SUMMARY

Various approaches are described herein for, among other things, providing a bowtie view of an environment. A bowtie view of an environment is a representation of a 360-degree image of the environment that is compressed at its center such that at least one side of the bowtie view is concave. For example, two opposing sides of the bowtie view may be concave. In accordance with this example, the two opposing sides may be top and bottom sides of the bowtie view.

In an example approach, a 360-degree image of an environment that is captured by a 360-degree camera is unwrapped to provide a flattened image. The flattened image is projected on an inner surface of a virtual object in a three-dimensional virtual environment. A portion of the flattened image is captured from the inner surface of the virtual object using a virtual camera to provide a bowtie view.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
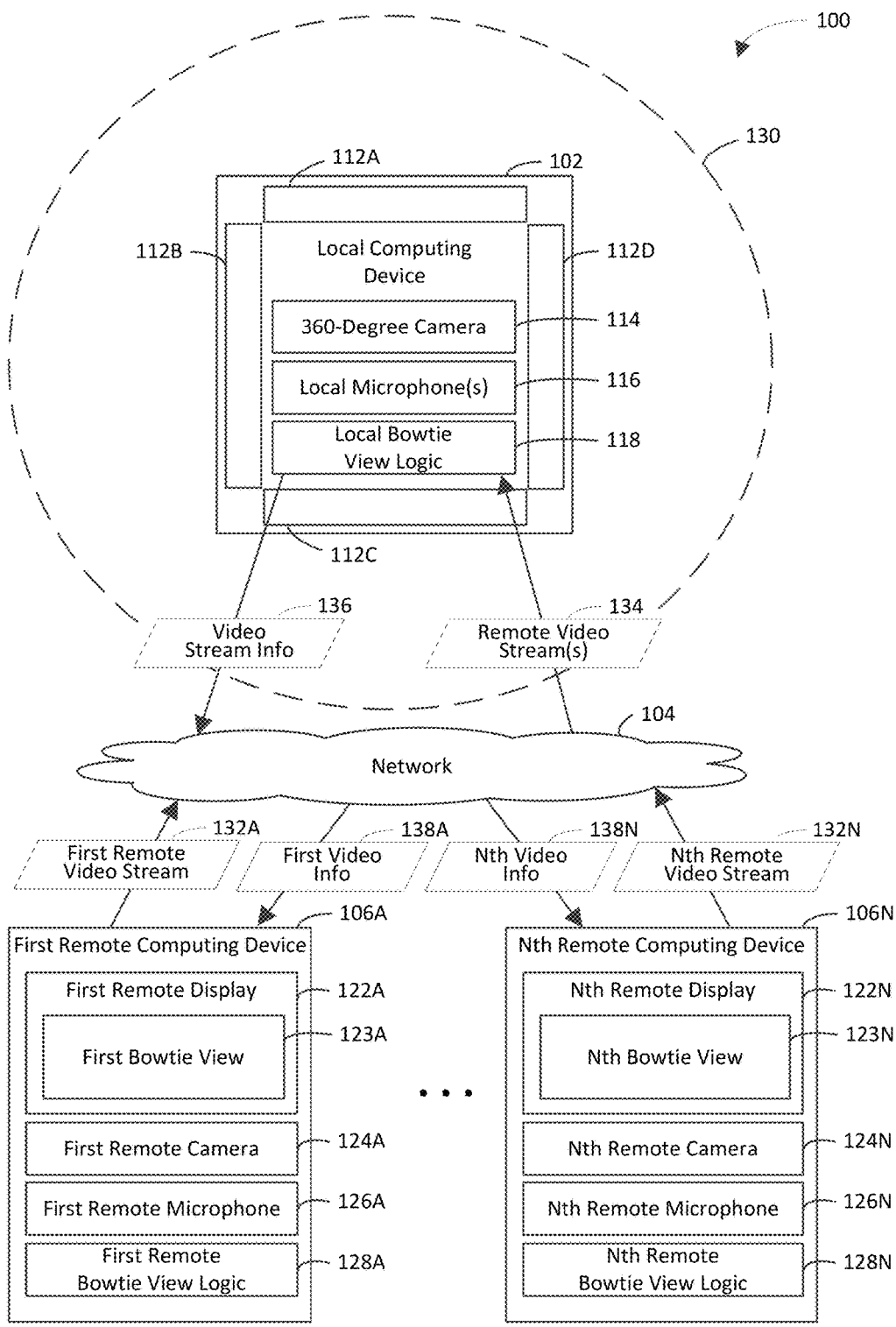
FIG. 1 is a block diagram of an example bowtie view system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing a bowtie view of an environment. A bowtie view of an environment is a representation of a 360-degree image of the environment that is compressed at its center such that at least one side of the bowtie view is concave. For example, two opposing sides of the bowtie view may be concave. In accordance with this example, the two opposing sides may be top and bottom sides of the bowtie view. In contrast to some representations of a 360-degree view that are configured as rectangles with content of the representations being outwardly bowed (e.g., to resemble viewing through a fish-eye lens), the shape of the bowtie view may be inwardly bowed with content of the bowtie view having relatively less outward bowing (e.g., negligible or no outward bowing).

Example techniques described herein have a variety of benefits as compared to conventional techniques for representing a 360-degree image. For instance, the example techniques may provide a representation of a 360-degree image that is less distorted than conventional representations of a 360-degree image. A representation that is provided in accordance with one or more of the example techniques may more accurately represent the physical environment in which the 360-degree image is captured. For instance, a bowtie view may depict a shape of a table on which a 360-degree camera is placed more accurately than conventional representations of a 360-degree image. The example techniques may be capable of compensating for a fish-eye representation of the environment without introducing additional distortions with regard to the 360-degree image. Accordingly, the bowtie view may provide a more natural perspective of the environment than conventional representations of a 360-degree image.

The bowtie view may be distinguishable from a standard camera view. A shape of the bowtie view may enable a user to recognize that the bowtie view is navigable by the user. For instance, the concave side(s) of the bowtie view may indicate to the user that the user may rotate the virtual camera to change which portion of the 360-degree image is represented by the bowtie view.

The example techniques may increase efficiency of communication among participants of a video conference. The example techniques may increase user efficiency (e.g., enabling the user to accurately view objects that would be in the user's peripheral vision in the physical environment, to more easily identify a speaker or person(s) to whom the speaker speaks or gestures) and/or user interaction performance during the video conference.

FIG. 1 is a block diagram of an example bowtie view system 100 in accordance with an embodiment. Generally speaking, bowtie view system 100 operates to providing a bowtie view of an environment. Bowtie view system 100 may provide a single bowtie view or multiple bowtie views which may be the same or different. As shown in FIG. 1, bowtie view system 100 includes a local computing device 102, a network 104, and a plurality of remote computing devices 106A-106N. Communication among local computing device 102 and remote computing devices 106A-106N is carried out over network 104 using well-known network communication protocols. Network 104 may be a wide-area network (e.g., the Internet), a local area network (LAN), another type of network, or a combination thereof.

Local computing device 102 is a processing system that is capable of communicating with remote computing devices 106A-106N. An example of a processing system is a system that includes at least one processor that is capable of manipulating data in accordance with a set of instructions. For instance, a processing system may be a computer, a game console, a personal digital assistant, etc. In an example video conferencing embodiment, local computing device 102 is a video conference device, which is configured to facilitate communication among participants of a video conference. Local computing device 102 includes displays 112A-112D, a 360-degree camera 114, local microphone(s) 116, and local bowtie view logic 118. Displays 112A-112D are configured to display remote video stream(s) 134. Remote video stream(s) 134 include one or more of remote video streams 132A-132N, which are provided by respective remote computing devices 106A-106N.

360-degree camera 114 is configured to capture a 360-degree image (e.g., a 360-degree image stream), which includes objects that are within a field of view 130 of 360-degree camera 114. Examples of an object include but are not limited to a person, a camera, a computing device, a display (e.g., an active display), a white board, and a chalk board.

In the example video conferencing embodiment, the objects include participant(s) of the video conference who are within the field of view 130 of 360-degree camera 114. Each participant of the video conference who is within the field of view 130 is referred to herein as a "local participant" for illustrative purposes and is not intended to be limiting. For instance, the local participant(s) may be in a conference room. In one example, the field of view 130 may extend a designated (e.g., pre-determined) radius from 360-degree camera 114. In another example, the field of view 130 may extend to the walls of a room in which the local participant(s) are located. Participants of the video conference who are associated with remote computing devices 106A-106N are not within the field of view 130 of 360-degree camera 114. The participants who are associated with remote computing devices 106A-106N are referred to herein as "remote participants" for illustrative purposes and are not intended to be limiting.

Local microphone(s) 116 are configured to receive speech of persons (e.g., local participants of a video conference) and other sounds that are audible to a human (e.g., frequencies in a range of 20 Hertz to 20,000 Hertz).

Local bowtie view logic 118 is configured to perform one or more of the operations described herein to provide a bowtie view (e.g., any one or more of bowtie views 123A-123N, which are discussed in further detail below). For instance, local bowtie view logic 118 may generate video stream information 136 based on the 360-degree image that is captured by 360-degree camera 114.

Video stream information 136 may include video information 138A-138N for respective remote computing devices 106A-106N. For example, the video information 138A-138N may include respective bowtie views 123A-123N. The video information 138A-138N may further include avatars to represent people within the field of view 130 and/or users of remote computing devices 106A-106N, any one or more of the remote video stream(s) 134, icons, widgets, etc. Each of the bowtie views 123A-123N may be the same as or different from any one or more others of the bowtie views 123A-123N.

Local bowtie view logic 118 unwraps the 360-degree image that is captured by 360-degree camera 114 to provide a flattened image. For example, the 360-degree image may resemble a doughnut. In accordance with this example, unwrapping the 360-degree image may include cutting the 360-degree image and straightening it into a linear strip to provide the flattened image. An example 360-degree image is described in further detail below with reference to FIG. 2. An example flattened image is described in further detail below with reference to FIG. 3.

Local bowtie view logic 118 projects the flattened image on an inner surface of a virtual object in a three-dimensional virtual environment. For instance, the ends of the flattened image may be coincident on the inner surface of the virtual object. Accordingly, local bowtie logic 118 may cause the flattened image to form a closed loop on the inner surface of the virtual object. The virtual object may be a cylinder or a sphere, for example.

For each bowtie view that is to be provided, local bowtie view logic 118 captures a portion of the flattened image from the inner surface of the virtual object using a virtual camera to provide the bowtie view. An example bowtie view is described in further detail below with reference to FIG. 4. An example virtual environment in which a portion of a flattened image may be captured from an inner surface of a virtual object is described in further detail below with reference to FIG. 5.

It will be recognized that the video stream information 136 may include the 360-degree image that is captured by 360-degree camera 114 and/or the flattened image in addition to or in lieu of the bowtie views 123A-123N. Accordingly, the video information 138A-138N may include the 360-degree image and/or the flattened image in addition to or in lieu of the respective bowtie views 123A-123N. It will be further recognized that some functionality of local bowtie view logic 118 and/or remote bowtie view logic 128A-128N may be cloud-based.

In a first example, the video stream information 136 may include the 360-degree image. In accordance with this example, a cloud-based service may unwrap the 360-degree image to provide the flattened image. In one aspect of this example, the video information 138A-138N may include the flattened image. In another aspect of this example, the cloud-based service may project the flattened image on the inner surface of the virtual object and capture a portion of the flattened image to provide the bowtie views 123A-123N. In accordance with this aspect, the video information 138A-138N may include the respective bowtie views 123A-123N.

In a second example, the video stream information 136 may include the flattened image. In accordance with this example, a cloud-based service may project the flattened image on the inner surface of the virtual object and capture a portion of the flattened image to provide the bowtie views 123A-123N. In accordance with this aspect, the video information 138A-138N may include the respective bowtie views 123A-123N.

Local bowtie view logic 118 may receive remote video stream(s) 134 from one or more of remote computing devices 106A-106N. In accordance with this example, the remote video stream(s) 134 may include any one or more of the remote video streams 132A-132N from respective remote computing devices 106A-106N. The remote video streams 132A-132N are described in further detail below. Local bowtie view logic 118 may display the remote video stream(s) 134 on displays 112A-112D.

Remote computing devices 106A-106N are processing systems that are capable of communicating with local computing device 102. Remote computing devices 106A-106N include respective remote displays 122A-122N, remote cameras 124A-124N, remote microphones 126A-126N, and remote bowtie view logic 128A-128N.

Remote displays 122A-122N are configured to display respective bowtie views 123A-123N. Any one or more of the bowtie views 123A-123N may be different from other(s) of the bowtie views 123A-123N. Any two or more of the bowtie views 123A-123N may be the same.

Remote cameras 124A-124N are configured to capture views of respective remote users (e.g., remote participants of a video conference). For example, first remote camera 124A may be configured to capture a first remote user who owns or otherwise has access to first remote computing device 106A. In another example, Nth remote camera 124N may be configured to capture an Nth remote user who owns or otherwise has access to Nth remote computing device 106N. Remote cameras 124A-124N are further configured to generate respective remote video streams 132A-132N based on the respective views that are captured by respective remote cameras 124A-124N.

Remote microphones 126A-126N are configured to receive speech of the respective remote users and other sounds that are audible to a human.

Remote bowtie view logic 128A-128N are configured to perform one or more of the operations described herein to provide a bowtie view (e.g., any one or more of bowtie views 123A-123N). In a first example, first video information 138A may include the 360-degree image that is captured by 360-degree camera 114. In accordance with this example, first remote bowtie view logic 128A may unwrap the 360-degree image to provide the flattened image. In further accordance with this example, first remote bowtie view logic 128A may project the flattened image on the inner surface of the virtual object and capture a portion of the flattened image to provide the bowtie view 123A.

In a second example, first video information 138A may include the flattened image. In accordance with this example, first remote bowtie view logic 128A may project the flattened image on the inner surface of the virtual object and capture a portion of the flattened image to provide the bowtie view 123A.

Remote computing devices 106A-106N may include any client-enabled system or device, including but not limited to a desktop computer, a laptop computer, a tablet computer, a personal digital assistant, a cellular telephone, a wearable device, or the like.

Example techniques for providing a bowtie view of an environment are discussed in greater detail below with reference to FIGS. 2-7.

Local bowtie view logic 118 and/or any of remote bowtie view logic 128A-128N may be implemented in various ways to provide a bowtie view of an environment, including being implemented in hardware, software, firmware, or any combination thereof. For example, local bowtie view logic 118 and/or any of remote bowtie view logic 128A-128N may be implemented as computer program code configured to be executed in one or more processors. In another example, local bowtie view logic 118 and/or any of remote bowtie view logic 128A-128N may be implemented as hardware logic/electrical circuitry. For instance, local bowtie view logic 118 and/or any of remote bowtie view logic 128A-128N may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
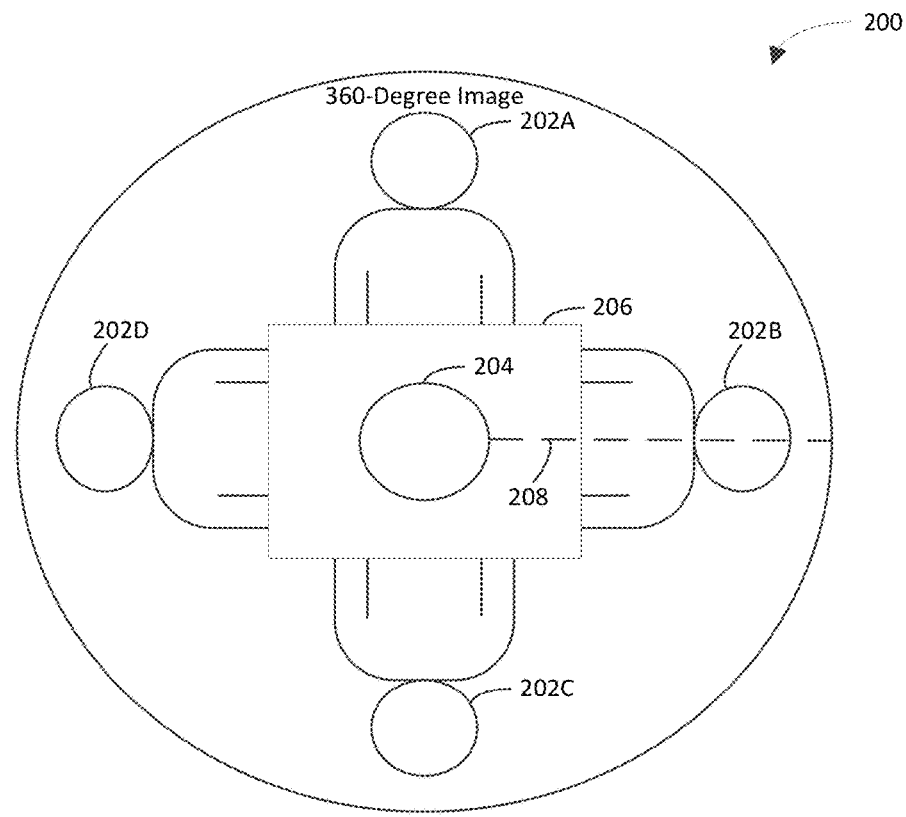
FIG. 2 depicts an example 360-degree image in accordance with an embodiment.

FIG. 2 depicts an example 360-degree image 200 in accordance with an embodiment. For instance, a 360-degree camera may include a 360-degree lens that captures light and funnels the light onto an image sensor (e.g., a chargecoupled device) to provide the 360-degree image 200. The 360-degree lens may be any suitable type of lens, including but not limited to a parabolic lens, a super-fish-eye lens (e.g., to capture a field of view greater than 180 degrees), a combination of two fish-eye lenses (e.g., placed back-to-back with two image sensors therebetween to capture a field of view of 360 degrees).

The 360-degree image 200 is shown to include a void 204. The void 204 may be caused by the 360-degree lens not capturing light from a portion of the physical environment that corresponds to the void 204 (e.g., in a blind spot of the 360-degree lens). The 360-degree image 200 is shown to include the void 204 for illustrative purposes and is not intended to be limiting. It will be recognized that the 360-degree image 200 need not necessarily include the void 204.

The 360-degree image 200 shows persons 202A-202D sitting around a table 206 on which the 360-degree camera is placed (e.g., in a video conference environment) for illustrative purposes. It will be recognized that the 360-degree image 200 shows all objects within the field of the view of the 360-degree camera.

The 360-degree image 200 may be unwrapped (e.g., cut and straightened into a linear strip) to provide a flattened image. For instance, the 360-degree image 200 may be cut along line 208, and the void 204 may be discarded. It will be recognized that the line 208 may extend to the center of the 360-degree image 200, for example, if the void 204 is not discarded or if the 360-degree image 200 does not include the void 204. After the 360-degree image 200 is cut, the 360-degree image 200 may be straightened by rotating the edges that result from the cutting away from each other (e.g., until the edges are parallel) to provide the linear strip. Accordingly, 360-degree image may be transformed (e.g., converted) from a circular form to a linear form to provide the flattened image.

Figure 3:
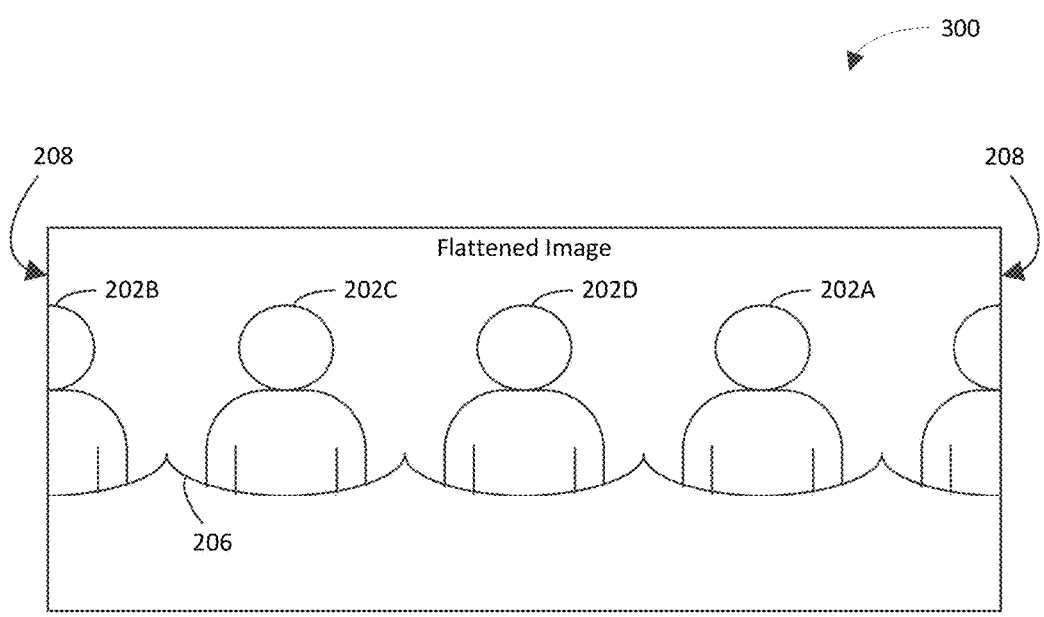
FIG. 3 depicts an example flattened image in accordance with an embodiment.

FIG. 3 depicts an example flattened image 300 in accordance with an embodiment. For instance, the flattened image 300 may be the result of unwrapping the 360-degree image 200 shown in FIG. 200. The flattened image 300 will be described accordingly for illustrative purposes. The flattened image 300 shows the persons 202A-202D sitting around the table 206. The line 208 along which the 360-degree image 200 was cut corresponds to the edges of the flattened image 300. It will be recognized that the shape of the table 206 is distorted in the flattened image 300. Such distortion is the natural result of unwrapping the 360-degree image 200.

Figure 4:
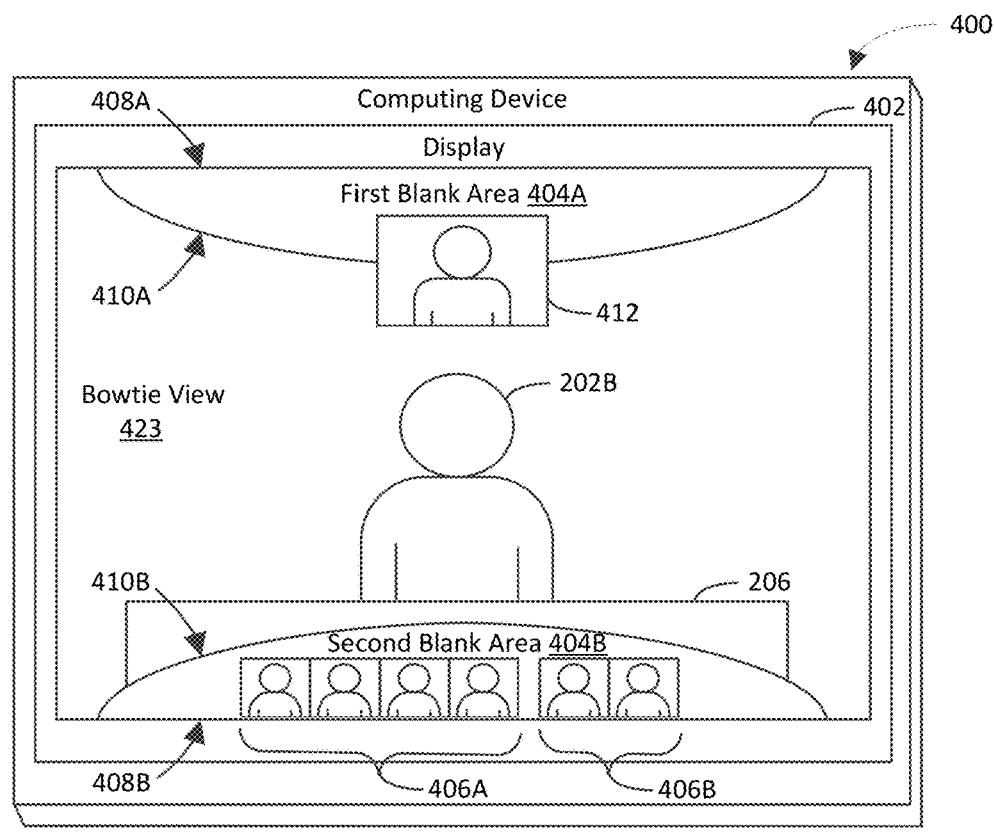
FIG. 4 is a block diagram of an example computing device showing a bowtie view in accordance with an embodiment.

FIG. 4 is a block diagram of an example computing device 400 showing a bowtie view 423 in accordance with an embodiment. Computing device 400 includes a display 402 on which the bowtie view 423 is displayed. The bowtie view 423 includes a portion of the flattened image 300 shown in FIG. 3 that has been projected on an inner surface of a virtual object in a three-dimensional virtual environment and captured from the inner surface by a virtual camera. The bowtie view 423 shows the person 202B and part of the table 206. For instance, the field of view of the virtual camera was set capture the person 202B and the part of the table 206 and to exclude the persons 202A, 202C, and 202D and the rest of the table 206 for illustrative purposes.

Bowtie view 423 is shown to have a concave upper edge 410A and a concave lower edge 410B. An area between the upper edge 410A of the bowtie view 423 and an upper edge of the display 402 is referred to as a first blank area 404A. An area between the lower edge 410B of the bowtie view 423 and a lower edge of the display 402 is referred to as a second blank area 404B. The first blank area 404A and the second blank area 404B may be used to display other information so that such information does not occlude objects that are shown in the bowtie view 423.

For example, a video stream 412 of a user who is viewing the bowtie view 423 on the display 402 is shown to partially overlap the first blank area 404A. In accordance with this example, the video stream 412 may enable the user to see a representation of the user that is being shown to other people (e.g., persons 202A-202D). The video stream 412 is shown to partially overlap the first blank area 404A for illustrative purposes and is not intended to be limiting. For instance, the video stream 412 may fully overlap the first blank area 404A. Accordingly, an entirety of the video stream 412 may be included in the first blank area 404A.

In another example, the second blank area 404B is shown to include avatars of participants of a video conference in which the user of the computing device 400 participates. The avatars include first avatars 406A and second avatars 406B. The first avatars 406A include still images of the persons 202A-202D who are in the field of view of the 360-degree camera (e.g., 360-degree camera 114). The second avatars 406B include still images of remote users who are not in the field of view of the 360-degree camera (e.g., users of any of remote computing devices 106A-106N).

Figure 5:
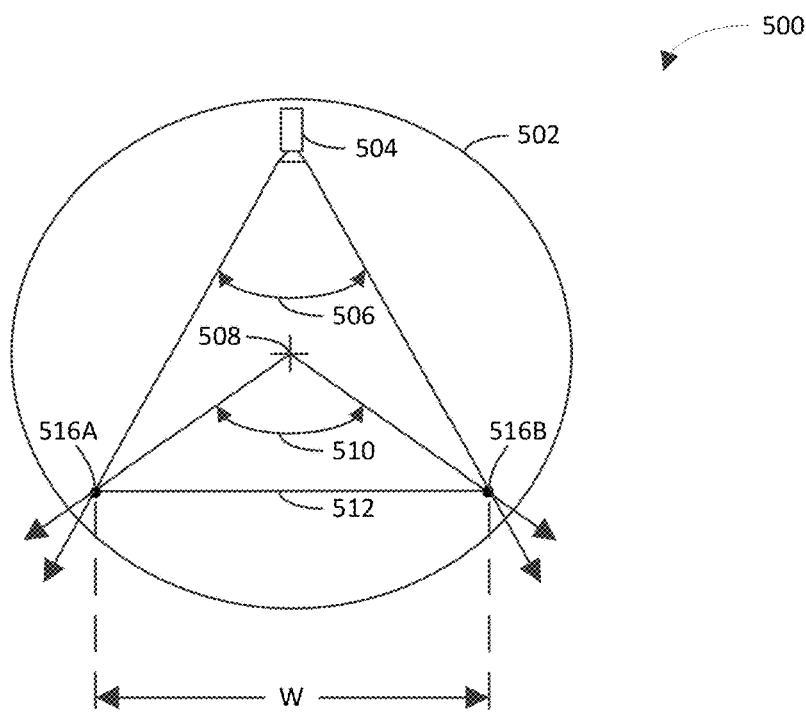
FIG. 5 is a block diagram of an example virtual environment that includes a virtual camera and a virtual object in accordance with an embodiment.

FIG. 5 is a block diagram of an example virtual environment 500 that includes a virtual camera 504 and a virtual object 502 in accordance with an embodiment. The virtual object 502 is shown to have a circular cross-section for illustrative purposes and is not intended to be limiting. For instance, the virtual object 502 may be a circular cylinder (e.g., a right circular cylinder) or a sphere. A line 512 represents a display (e.g., a screen) on which a bowtie view (e.g., bowtie view 423) is to be displayed. The display has a width, W, which is defined by points 516A and 516B in the virtual environment 500.

The virtual camera 504 has a camera field of view 506. For instance, a vertex of the camera field of view 506 may be at a virtual lens of the virtual camera. The virtual object 502 has an object field of view 510. For instance, a vertex of the object field of view 510 may be at a center 508 of the circular cross-section of the virtual object 502. The camera field of view 506 and the object field of view 510 intersect at the points 516A and 516B. As depicted in FIG. 5, the points 516A and 516B may not be coincident with the inner surface of the virtual object 502. In the embodiment of FIG. 5, the points 516A and 516B are shown to be a spaced distance from the inner surface of the virtual object 502 in a region that is defined by the inner surface of the virtual object 502.

Configuring the points 516A and 516B as shown in FIG. 5 (i.e., a spaced distance from the inner surface of the virtual object 502 in a region that is defined by the inner surface of the virtual object 502) may cause upper and lower concave edges of the bowtie view to intersect respective upper and lower edges of a display on which the bowtie view is displayed at designated points, which define a distance along the upper and lower edges of the display that is less than a width of the upper and lower edges of the display. An example result of configuring the points 516A and 516B in this manner is illustrated in FIG. 4. As shown in FIG. 4, the first blank area 404A and the second blank area 404B do not span an entire width of the upper edge 408A and the lower edge 408B, respectively, of display 402. Accordingly, a width of the first blank area 404A along the upper edge 408A is less than the width of the upper edge 408A. A width of the second blank area 404B along the lower edge 408B is less than the width of the lower edge 408B.

In another example embodiment, the points 516A and 516B are coincident with the inner surface of the virtual object 502. In accordance with this embodiment, the upper and lower concave edges of the bowtie view intersect respective upper and lower edges of the display on which the bowtie view is displayed at corners of the display. For example, if the points 516A and 516B were configured in this manner to provide the bowtie view 423 shown in FIG. 4, the first blank area 404A and the second blank area 404B would span the entire width of the upper edge 408A and the lower edge 408B, respectively, of the display 402. In accordance with this example, the width of the upper edge 408A of display 402 and a width of the first blank area 404A along the upper edge 408A would be same. In further accordance with this example, the width of the lower edge 408B of display 402 and a width of the second blank area 404B along the lower edge 408B would be same.

In the embodiment of FIG. 5, the diameter of the virtual object 502 may be calculated as a function of the width, W, of the display on which the bowtie view is to be displayed. For instance, if the points 516A and 516B were coincident with the inner surface of the virtual object 502, the diameter of the virtual object 502 could be calculated in accordance with the following equation:

$$d = W/\sin(\theta/2)$$  Equation 1 where d is the diameter of the virtual object 502, W is the width of the display, and θ is the object field of view 510. It will be recognized that the calculation of the diameter of the virtual object 502 as depicted in FIG. 5 would need to be modified to account for the points 516A and 516B not being coincident with the inner surface of the virtual object 502.

Moving the virtual camera 504 farther away from the display, which is represented by line 512, causes the bowtie effect in the bowtie view to lessen (e.g., flatten out), and vice versa. Moving the virtual camera 504 closer to the display causes the bowtie effect to increase (e.g., compress more at the center). By decoupling the camera field of view 506 from the object field of view 510, the amount of bowtie effect in the bowtie view may be adjusted (e.g., fine-tuned). Accordingly, as factors such as screen aspect ratios, screen sizes, etc. change, the amount of the bowtie effect may be adjusted to accommodate other aspects of the user interface (e.g., avatars, navigational elements, and other video streams). For instance, changing the amount of the bowtie effect may change an amount of surface area on the user interface that is allocated to those other aspects. It should be noted that as the virtual camera 504 is moved in and out, the field of view of the virtual camera 504 changes, but the boundaries of the field of view may remain pinned to the points 516A and 516B. Pinning the boundaries of the field of view to the points 516A and 516B causes the bowtie view to maintain a constant size as the virtual camera 504 is moved closer to and/or farther away from the display.

The virtual camera 504 may view the flattened image on the inner surface of the virtual object 502 perspectively, rather orthographically. For instance, viewing the flattened image orthographically may result in a rectangle that has a distortion at its edges (e.g., as the image wraps toward the viewer). Whereas, viewing the flattened image perspectively may enable the virtual camera 504 to provide the bowtie view.

By viewing the flattened image perspectively, the points at the corners of the flattened image are closer to the virtual camera 504, and the points in the middle of the flattened image are farther away from the virtual camera 504. As the focal length of the virtual camera 504 is increased or decreased, the relationship between those points becomes more exaggerated or less exaggerated.

Figure 6:
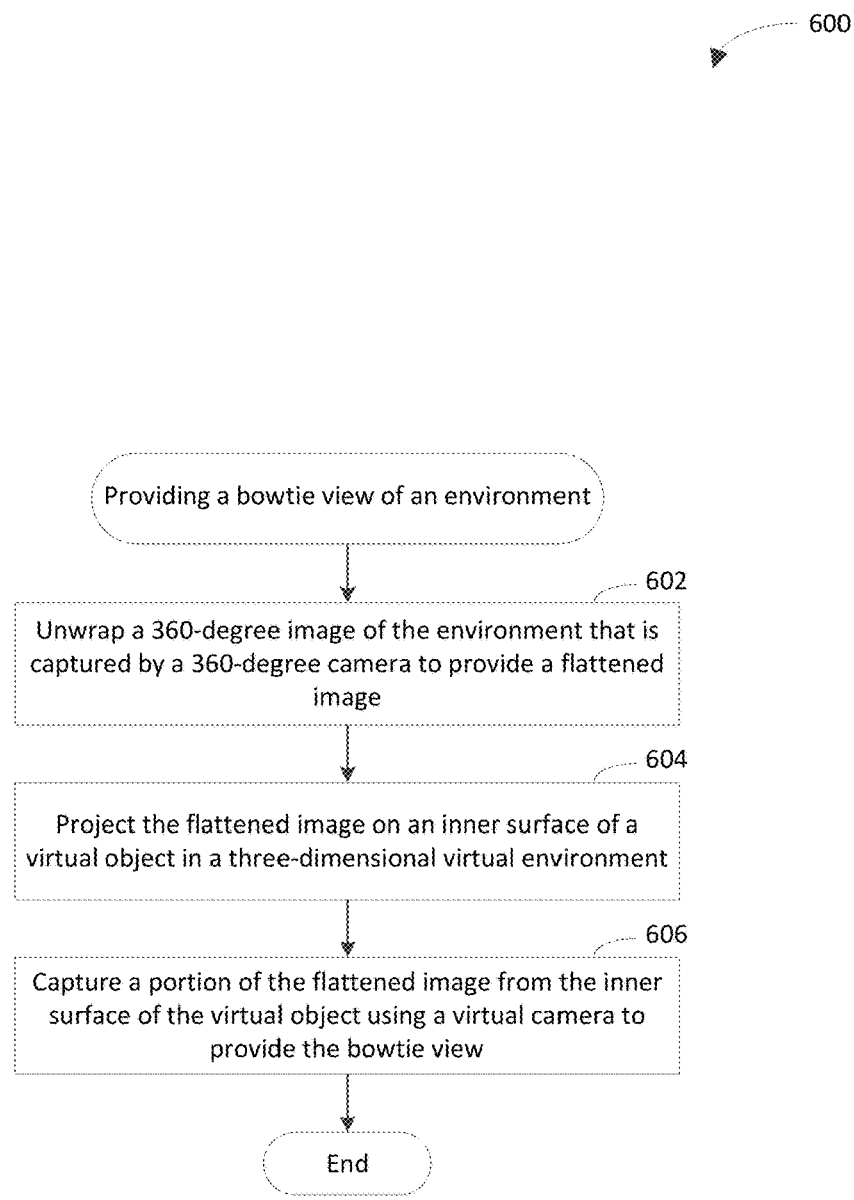
FIG. 6 depicts a flowchart of an example method for providing a bowtie view in accordance with an embodiment.
Figure 7:
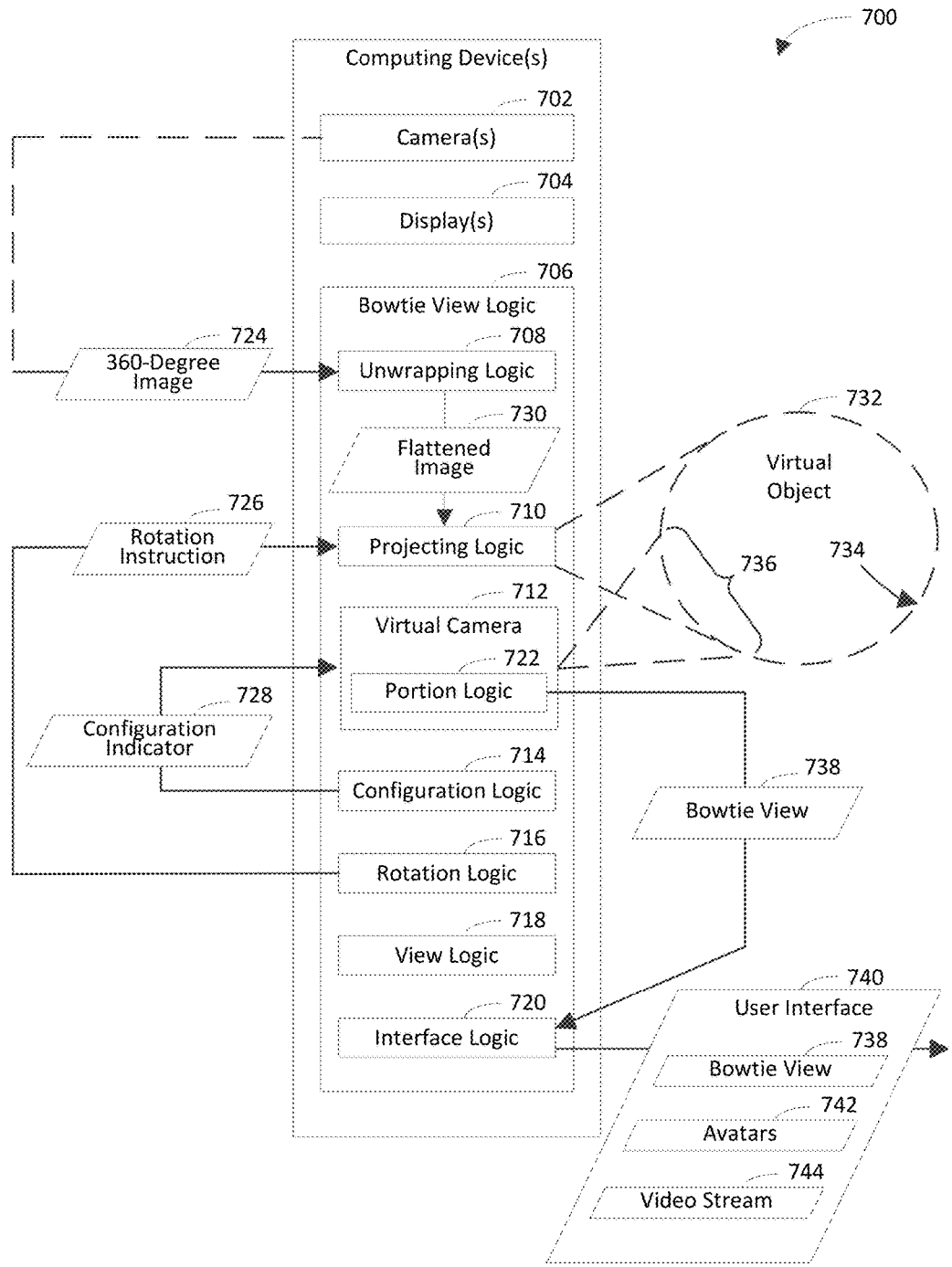
FIG. 7 is a block diagram of an example computing system in accordance with an embodiment.

FIG. 6 depicts a flowchart 600 of an example method for providing a bowtie view in accordance with an embodiment. Flowchart 600 may be performed by local computing device 102 and/or any one or more of remote computing devices 106A-106N shown in FIG. 1, for example. For illustrative purposes, flowchart 600 is described with respect to computing device(s) 700 shown in FIG. 7. For instance, computing device(s) 700 may be an example implementation of local computing device 102 and/or any one or more of remote computing devices 106A-106N shown in FIG. 1. As shown in FIG. 7, computing device(s) 700 includes camera(s) 702, display(s) 704, and bowtie view logic 706. Bowtie view logic 1102 includes unwrapping logic 708, projecting logic 710, a virtual camera 712, configuration logic 714, rotation logic 716, view logic 718, and interface logic 720. Virtual camera 712 includes portion logic 722. Further structural and operational embodiments will be apparent to persons skilled in the relevant art(s) based on the discussion regarding flowchart 600.

As shown in FIG. 6, the method of flowchart 600 begins at step 602. In step 602, a 360-degree image of the environment that is captured by a 360-degree camera is unwrapped to provide a flattened image. In an example implementation, unwrapping logic 708 unwraps a 360-degree image 724 of the environment to provide a flattened image 730. The 360-degree camera may be included in camera(s) 702, though the scope of the example embodiments is not limited in this respect. For instance, camera(s) 702 need not necessarily capture the 360-degree image 724, as depicted by the dashed line leading from camera(s) 702 in FIG. 7.

At step 604, the flattened image is projected on an inner surface of a virtual object in a three-dimensional virtual environment. For instance, the virtual object may be a cylinder or a sphere. In an example implementation, projecting logic 710 projects the flattened image 730 on an inner surface 734 of a virtual object 732 in the three-dimensional virtual environment. The virtual object cis shown to have a circular cross-section in FIG. 7 for non-limiting illustrative purposes.

At step 606, a portion of the flattened image is captured from the inner surface of the virtual object using a virtual camera to provide the bowtie view. For instance, the portion of the flattened image may be captured from the inner surface of the virtual object in accordance with a perspective view of the virtual camera. It will be recognized that a size (e.g., radius) of the virtual object may depend on the virtual camera and/or a height of the flattened image. In an example implementation, virtual camera 712 captures a portion 736 of the flattened image 730 from the inner surface 734 of the virtual object 732 to provide a bowtie view 738.

In some example embodiments, one or more steps 602, 604, and/or 606 of flowchart 600 may not be performed. Moreover, steps in addition to or in lieu of steps 602, 604, and/or 606 may be performed. For instance, in a first example embodiment, a distance between the virtual camera and the portion of the flattened image is selected (e.g., based on one or more criteria). In an example implementation, configuration logic 714 selects a distance between virtual camera 712 and the portion 736 of the flattened image 730. For example, configuration logic 714 may generate a configuration indicator 728 in response to selecting the distance between virtual camera 712 and the portion 736 of the flattened image 730. The configuration indicator 728 may specify the distance between virtual camera 712 and the portion 736 of the flattened image 730. In accordance with this example, receipt of the configuration indicator 728 at virtual camera 712 may configure virtual camera 712 to be the distance from the portion 736 of the flattened image 730 that is specified by the configuration indicator 728.

Virtual camera 712 is shown to be outside a region that is defined by the inner surface 734 of the virtual object 732 for non-limiting illustrative purposes. It will be recognized that virtual camera 712 may be in the region that is defined by the inner surface 734 of the virtual object 732. For instance, having virtual camera 712 in the region may facilitate capture of the portion 736 of the flattened image 730 from the inner surface 734 of the virtual object 732.

In an aspect of this embodiment, the distance between the virtual camera and the portion of the flattened image is selected to accommodate placement of an interface element between an upper or lower edge of the bowtie view and a respective upper or lower edge of a display on which the bowtie view is to be displayed. Examples of an interface element include but are not limited to text, an icon, and a widget. For instance, the distance may be selected to accommodate placement of the interface element between the upper or lower edge of the bowtie view and a respective upper or lower edge of a rectangle that is defined by corners of the bowtie view.

In another aspect of this embodiment, the distance between the virtual camera and the portion of the flattened image is selected based on an aspect ratio of a display on which the bowtie view is to be displayed. Examples of an aspect ratio include but are not limited to 16:9, 16:10, 4:3, and 2:3.

In yet another aspect of this embodiment, the distance between the virtual camera and the portion of the flattened image is selected based on a size of a display on which the bowtie view is to be displayed. For instance, the size may be a width or a surface area of the display.

In a second example embodiment, the virtual object is a cylinder. For instance, the cylinder may have any suitable cross-section (e.g., a circular cross-section or an elliptical cross-section). In an aspect of this embodiment, the method of flowchart 600 further includes positioning the virtual camera such that a distance between the virtual camera and the portion of the flattened image is greater than a distance between an axis that extends along the cylinder and the portion of the flattened image. The distance between the virtual camera and the portion of the flattened image may determine an amount of a bowtie effect on the bowtie view. For instance, decreasing the distance between the virtual camera and the portion of the flattened image may increase the amount of the bowtie effect (i.e., increase concavity of one or more sides of the bowtie view). Increasing the distance between the virtual camera and the portion of the flattened image may decrease the amount of the bowtie effect (i.e., decrease concavity of one or more sides of the bowtie view).

In an example implementation, configuration logic 714 positions virtual camera 712 such that a distance between virtual camera 712 and the portion 736 of the flattened image 730 is greater than a distance between the axis that extends along the cylinder and the portion 736 of the flattened image 730. For example, configuration logic 714 may generate a configuration indicator 728 to specify the distance between virtual camera 712 and the portion 736 of the flattened image 730. In accordance with this example, receipt of the configuration indicator 728 at virtual camera 712 may cause virtual camera 712 to be positioned such that the distance between virtual camera 712 and the portion 736 of the flattened image 730 is greater than a distance between the axis that extends along the cylinder and the portion 736 of the flattened image 730.

In another aspect of this embodiment, the method of flowchart 600 further includes positioning the virtual camera such that a distance between the virtual camera and the portion of the flattened image is less than a diameter of the cylinder. In an example implementation, configuration logic 714 positions virtual camera 712 such that a distance between virtual camera 712 and the portion 736 of the flattened image 730 is less than the diameter of the cylinder.

In yet another aspect of this embodiment, a distance between points in the virtual object represents a width of a display on which the bowtie view is to be displayed. In accordance with this aspect, the method of flowchart 600 further includes configuring the virtual camera to cause a field of view of the virtual camera and a field of view of the cylinder to intersect at the points. For example, the virtual camera may be configured to cause the field of view of the virtual camera and the field of view of the cylinder to continue to intersect at the points as a distance between the virtual camera and the portion of the flattened image changes. In another example, the points may be coincident with the inner surface of the virtual object. In yet another example, the points may be a spaced distance from the inner surface of the virtual object (e.g., in a finite area defined by the inner surface).

In an example implementation, a distance between points in the virtual object 732 represents a width of a display on which the bowtie view 738 is to be displayed. The display may or may not be included in display(s) 704. In accordance with this implementation, configuration logic 714 configures virtual camera 712 to cause a field of view of virtual camera 712 and a field of view of the cylinder to intersect at the points. For example, configuration logic 714 may generate a configuration indicator 728 to specify the field of view of virtual camera 712. In accordance with this example, receipt of the configuration indicator 728 at virtual camera 712 may configure virtual camera 712 to cause the field of view of virtual camera 712 and the field of view of the cylinder to intersect at the points.

In still another aspect of this embodiment, a field of view of the cylinder is set to be in a range between 100 degrees and 120 degrees, between 105 degrees and 115 degrees, or between 107.5 degrees and 112.5 degrees. For instance, the field of view of the cylinder may be set to be 110 degrees. In an example implementation, view logic 718 sets the field of view of the cylinder.

In yet another aspect of this embodiment, the method of flowchart 600 further includes configuring the cylinder to have a diameter that is based on an aspect ratio of a display on which the bowtie view is to be displayed. In an example implementation, configuration logic 714 configures the cylinder to have a diameter that is based on an aspect ratio of a display on which the bowtie view 738 is to be displayed.

In still another aspect of this embodiment, the method of flowchart 600 further includes configuring the cylinder to have a diameter that is based on a width of a display on which the bowtie view is to be displayed. In an example implementation, configuration logic configures the cylinder to have a diameter that is based on a width of a display on which the bowtie view 738 is to be displayed.

In a third example embodiment, the virtual object has a circular cross-section (e.g., in a plane that is perpendicular to the inner surface of the virtual object on which the flattened image is projected). In an aspect of this embodiment, the method of flowchart 600 further includes positioning the virtual camera such that a distance between the virtual camera and the portion of the flattened image is greater than a radius of the circular cross-section. In an example implementation, configuration logic 714 positions virtual camera 712 such that a distance between virtual camera 712 and the portion 736 of the flattened image 730 is greater than the radius of the circular cross-section.

In another aspect of this embodiment, the method of flowchart 600 further includes positioning the virtual camera such that a distance between the virtual camera and the portion of the flattened image is less than a diameter of the circular cross-section. In an example implementation, configuration logic 714 positions virtual camera 712 such that a distance between virtual camera 712 and the portion 736 of the flattened image 730 is less than the diameter of the circular cross-section.

In yet another aspect of this embodiment, a distance between points in the virtual object represents a width of a display on which the bowtie view is to be displayed. In accordance with this aspect, the method of flowchart 600 further includes configuring the virtual camera to cause a field of view of the virtual camera and a field of view from a center of the circular cross-section to intersect at the points. For example, the virtual camera may be configured to cause the field of view of the virtual camera and the field of view from the center of the circular cross-section to continue to intersect at the points as a distance between the virtual camera and the portion of the flattened image changes. The points may or may not be coincident with the inner surface of the virtual object. In an example implementation, a distance between points in the virtual object 732 represents a width of a display on which the bowtie view 738 is to be displayed. In accordance with this implementation, configuration logic 714 configures virtual camera 712 to cause a field of view of virtual camera 712 and the field of view from the center of the circular cross-section to intersect at the points.

In still another aspect of this embodiment, the method of flowchart 600 further includes setting a field of view from a center of the circular cross-section to be in a range between 100 degrees and 120 degrees, between 105 degrees and 115 degrees, or between 107.5 degrees and 112.5 degrees. For instance, the field of view from the center of the circular cross-section may be set at 110 degrees. In an example implementation, view logic 718 sets the field of view from the center of the circular cross-section to be in the range.

In yet another aspect of this embodiment, the method of flowchart 600 further includes configuring the circular cross-section to have a diameter that is based on an aspect ratio of a display on which the bowtie view is to be displayed. In an example implementation, configuration logic 714 configures the circular cross-section to have a diameter that is based on an aspect ratio of a display on which the bowtie view 738 is to be displayed.

In still another aspect of this embodiment, the method of flowchart 600 further includes configuring the circular cross-section to have a diameter that is based on a width of a display on which the bowtie view is to be displayed. In an example implementation, configuration logic 714 configures the circular cross-section to have a diameter that is based on a width of a display on which the bowtie view 738 is to be displayed.

In a fourth example embodiment, the method of flowchart 600 further includes causing a projection of the flattened image on the inner surface of the virtual object to be rotatable with reference to the virtual camera by a user of a device on which the bowtie view is to be displayed. In an example implementation, rotation logic 716 causes a projection of the flattened image 730 on the inner surface 734 of the virtual object 732 to be rotatable with reference to virtual camera 712 by a user of a device on which the bowtie view 738 is to be displayed. For instance, rotation logic 716 may generate a rotation instruction 726. The rotation instruction 726 may instruct projecting logic 710 to enable the projection of the flattened image 730 on the inner surface 734 of the virtual object 732 to be rotatable with reference to virtual camera 712 (e.g., in response to user instructions). Projecting logic 710 may enable the projection of the flattened image 730 to be rotatable in response to receipt of the rotation instruction 726.

In a fifth example embodiment, the method of flowchart 600 further includes receiving an indicator, which specifies selection of the portion of the flattened image, from a device on which the bowtie view is to be displayed. For instance, the indicator may specify selection of the portion of the flattened image by a user of the device. In an example implementation, portion logic 722 receives the indicator. In accordance with this embodiment, capturing the portion of the flattened image at step 606 includes selecting the portion from a plurality of portions of the flattened image to provide the bowtie view for display on the device based on receipt of the indicator. In an example implementation, portion logic 722 selects the portion from a plurality of portions of the flattened image 730 to provide the bowtie view 738 for display on the device based on receipt of the indicator.

In a sixth example embodiment, the method of flowchart 600 further includes receiving an indicator from a device on which the bowtie view is to be displayed. The indicator specifies an attribute of the device. In an example implementation, portion logic 722 receives the indicator. In accordance with this embodiment, capturing the portion of the flattened image at step 606 includes selecting a version of the portion from a plurality of versions of the portion to provide the bowtie view for display on the device based on the attribute that is specified by the indicator. For example, the versions of the portion may correspond to respective attributes. The attributes include the attribute that is specified by the indicator. Examples of an attribute include but are not limited to an aspect ratio, a screen size, a device type (e.g., PDA, tablet, laptop, desktop, television), a make, and a model. In another example, each version may include the portion in a respective format (e.g., spatial format). In an example implementation, portion logic 722 selects a version of the portion from the plurality of versions of the portion to provide the bowtie view 738 for display on the device based on the attribute that is specified by the indicator.

In a seventh example embodiment, the method of flowchart 600 further includes configuring the virtual camera and/or the virtual object in real-time (e.g., dynamically, on-the-fly) based on an attribute associated with a display on which the bowtie view is to be displayed. For instance, a field of view of the virtual camera may be changed based on the attribute associated with the display. In an example implementation, configuration logic 714 configures virtual camera 712 and/or the virtual object 732 in real-time based on the attribute.

In an eighth example embodiment, the method of flowchart 600 further includes causing a projection of the flattened image on the inner surface of the virtual object to spin with reference to the virtual camera in response to initiation of a video conference. For instance, causing the projection to spin may cause participants of the video conference who are in a field of view of the 360-degree camera to be shown in the bowtie view as the projection spins. For example, causing the projection to spin may indicate to a user who views the bowtie view that the user is at the center of the room in which the 360-degree camera is located. In another example, identifying information (e.g., name tags) of the participants who are in the field of view may be shown proximate the participants as the projection spins.

In an example implementation, rotation logic 716 causes a projection of the flattened image 730 on the inner surface 734 of the virtual object 732 to spin with reference to virtual camera 712 in response to initiation of the video conference. For instance, causing the projection to spin may cause participants of the video conference who are in the field of view of the 360-degree camera to be shown in the bowtie view 738 as the projection spins. For example, rotation logic 716 may generate a rotation instruction 726. The rotation instruction 726 may instruct projecting logic 710 to spin the projection of the flattened image 730 on the inner surface 734 of the virtual object 732 with reference to virtual camera 712 in response to initiation of the video conference. Projecting logic 710 may spin the projection of the flattened image 730 on the inner surface 734 of the virtual object 732 with reference to virtual camera 712 when the video conference is initiated in response to receipt of the rotation instruction 726.

In a ninth example embodiment, the method of flowchart 600 further includes configuring a user interface to include the bowtie view and to further include avatars of participants (e.g., local participant(s) and/or remote participant(s)) of a video conference in a region between a lower edge of the bowtie view and a lower edge of a display on which the bowtie view is to be displayed. In an example implementation, interface logic 720 configuring a user interface 740 to include the bowtie view 738 and to further include avatars 742 of participants of the video conference in a region between a lower edge of the bowtie view 738 and a lower edge of a display on which the bowtie view 738 is to be displayed.

In a tenth example embodiment, the method of flowchart 600 further includes configuring a user interface to include the bowtie view and to further include a video stream of a participant of a video conference who is not in a field of view of the 360-degree camera. In accordance with this embodiment, at least a portion of the video stream overlaps a region between an upper edge of the bowtie view and an upper edge of a display of a computing device of the participant on which the bowtie view is to be displayed. In an example implementation, interface logic 720 configures a user interface 740 to include the bowtie view 738 and to further include a video stream 744 of the participant of the video conference who is not in the field of view of the 360-degree camera. In accordance with this implementation, at least a portion of the video stream 744 overlaps a region between an upper edge of the bowtie view 738 and an upper edge of the display of the computing device of the participant on which the bowtie view 738 is to be displayed.

It will be recognized that computing device(s) 700 may not include one or more of camera(s) 702, display(s) 704, bowtie view logic 706, unwrapping logic 708, projecting logic 710, virtual camera 712, configuration logic 714, rotation logic 716, view logic 718, interface logic 720, and/or portion logic 722. Furthermore, computing device(s) 700 may include components in addition to or in lieu of camera(s) 702, display(s) 704, bowtie view logic 706, unwrapping logic 708, projecting logic 710, virtual camera 712, configuration logic 714, rotation logic 716, view logic 718, interface logic 720, and/or portion logic 722.

Any one or more of remote bowtie view logic 128A-128N, local bowtie view logic 118, camera(s) 702, display(s) 704, bowtie view logic 706, unwrapping logic 708, projecting logic 710, virtual camera 712, configuration logic 714, rotation logic 716, view logic 718, interface logic 720, portion logic 722, and/or flowchart 600 may be implemented in hardware, software, firmware, or any combination thereof.

For example, any one or more of remote bowtie view logic 128A-128N, local bowtie view logic 118, camera(s) 702, display(s) 704, bowtie view logic 706, unwrapping logic 708, projecting logic 710, virtual camera 712, configuration logic 714, rotation logic 716, view logic 718, interface logic 720, portion logic 722, and/or flowchart 600 may be implemented, at least in part, as computer program code configured to be executed in one or more processors.

In another example, any one or more of remote bowtie view logic 128A-128N, local bowtie view logic 118, camera(s) 702, display(s) 704, bowtie view logic 706, unwrapping logic 708, projecting logic 710, virtual camera 712, configuration logic 714, rotation logic 716, view logic 718, interface logic 720, portion logic 722, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In an example method of providing a bowtie view of an environment, a 360-degree image of the environment that is captured by a 360-degree camera is unwrapped to provide a flattened image. The flattened image is projected on an inner surface of a virtual object in a three-dimensional virtual environment. A portion of the flattened image is captured from the inner surface of the virtual object using a virtual camera to provide the bowtie view.

In a first aspect of the example method, the example method further comprises selecting a distance between the virtual camera and the portion of the flattened image to accommodate placement of an interface element between an upper or lower edge of the bowtie view and a respective upper or lower edge of a display on which the bowtie view is to be displayed.

In a second aspect of the example method, the example method further comprises selecting a distance between the virtual camera and the portion of the flattened image based on an aspect ratio of a display on which the bowtie view is to be displayed. The second aspect of the example method may be implemented in combination with the first aspect of the example method, though the example embodiments are not limited in this respect.

In a third aspect of the example method, the example method further comprises selecting a distance between the virtual camera and the portion of the flattened image based on a size of a display on which the bowtie view is to be displayed. The third aspect of the example method may be implemented in combination with the first and/or second aspect of the example method, though the example embodiments are not limited in this respect.

In a fourth aspect of the example method, the example method further comprises causing a projection of the flattened image on the inner surface of the virtual object to be rotatable with reference to the virtual camera by a user of a device on which the bowtie view is to be displayed. The fourth aspect of the example method may be implemented in combination with the first, second, and/or third aspect of the example method, though the example embodiments are not limited in this respect.

In a fifth aspect of the example method, the example method further comprises receiving an indicator, which specifies selection of the portion of the flattened image, from a device on which the bowtie view is to be displayed. In accordance with the fifth aspect, capturing the portion of the flattened image comprises selecting the portion from a plurality of portions of the flattened image to provide the bowtie view for display on the device based on receipt of the indicator. The fifth aspect of the example method may be implemented in combination with the first, second, third, and/or fourth aspect of the example method, though the example embodiments are not limited in this respect.

In a sixth aspect of the example method, the example method further comprises receiving an indicator from a device on which the bowtie view is to be displayed, the indicator specifying an attribute of the device. In accordance with the sixth aspect, capturing the portion of the flattened image comprises selecting a version of the portion from a plurality of versions of the portion to provide the bowtie view for display on the device based on the attribute that is specified by the indicator. The sixth aspect of the example method may be implemented in combination with the first, second, third, fourth, and/or fifth aspect of the example method, though the example embodiments are not limited in this respect.

In a seventh aspect of the example method, the example method further comprises configuring at least one of the virtual camera or the virtual object in real-time based on an attribute associated with a display on which the bowtie view is to be displayed. The seventh aspect of the example method may be implemented in combination with the first, second, third, fourth, fifth, and/or sixth aspect of the example method, though the example embodiments are not limited in this respect.

In an eighth aspect of the example method, the virtual object is a cylinder. In accordance with the eighth aspect, the example method further comprises positioning the virtual camera such that a distance between the virtual camera and the portion of the flattened image is greater than a distance between an axis that extends along the cylinder and the portion of the flattened image. The eighth aspect of the example method may be implemented in combination with the first, second, third, fourth, fifth, sixth, and/or seventh aspect of the example method, though the example embodiments are not limited in this respect.

In a ninth aspect of the example method, the virtual object is a cylinder. In accordance with the ninth aspect, the example method further comprises positioning the virtual camera such that a distance between the virtual camera and the portion of the flattened image is less than a diameter of the cylinder. The ninth aspect of the example method may be implemented in combination with the first, second, third, fourth, fifth, sixth, seventh, and/or eighth aspect of the example method, though the example embodiments are not limited in this respect.

In a tenth aspect of the example method, the virtual object is a cylinder. In accordance with the tenth aspect, a distance between points in the virtual object represents a width of a display on which the bowtie view is to be displayed. In further accordance with the tenth aspect, the example method further comprises configuring the virtual camera to cause a field of view of the virtual camera and a field of view of the cylinder to intersect at the points. The tenth aspect of the example method may be implemented in combination with the first, second, third, fourth, fifth, sixth, seventh, eighth, and/or ninth aspect of the example method, though the example embodiments are not limited in this respect.

In an eleventh aspect of the example method, the virtual object is a cylinder. In accordance with the eleventh aspect, the example method further comprises setting a field of view of the cylinder to be in a range between 100 degrees and 120 degrees. The eleventh aspect of the example method may be implemented in combination with the first, second, third, fourth, fifth, sixth, seventh, eighth, ninth, and/or tenth aspect of the example method, though the example embodiments are not limited in this respect.

In a twelfth aspect of the example method, the virtual object is a cylinder. In accordance with the twelfth aspect, the example method further comprises configuring the cylinder to have a diameter that is based on an aspect ratio of a display on which the bowtie view is to be displayed. The twelfth aspect of the example method may be implemented in combination with the first, second, third, fourth, fifth, sixth, seventh, eighth, ninth, tenth, and/or eleventh aspect of the example method, though the example embodiments are not limited in this respect.

In a thirteenth aspect of the example method, the virtual object is a cylinder. In accordance with the thirteenth aspect, the example method further comprises configuring the cylinder to have a diameter that is based on a width of a display on which the bowtie view is to be displayed. The thirteenth aspect of the example method may be implemented in combination with the first, second, third, fourth, fifth, sixth, seventh, eighth, ninth, tenth, eleventh, and/or twelfth aspect of the example method, though the example embodiments are not limited in this respect.

In a fourteenth aspect of the example method, the virtual object has a circular cross-section. In accordance with the fourteenth aspect, the example method further comprises positioning the virtual camera such that a distance between the virtual camera and the portion of the flattened image is greater than a radius of the circular cross-section. The fourteenth aspect of the example method may be implemented in combination with the first, second, third, fourth, fifth, sixth, seventh, eighth, ninth, tenth, eleventh, twelfth, and/or thirteenth aspect of the example method, though the example embodiments are not limited in this respect.

In a fifteenth aspect of the example method, the virtual object has a circular cross-section. In accordance with the fifteenth aspect, the example method further comprises positioning the virtual camera such that a distance between the virtual camera and the portion of the flattened image is less than a diameter of the circular cross-section. The fifteenth aspect of the example method may be implemented in combination with the first, second, third, fourth, fifth, sixth, seventh, eighth, ninth, tenth, eleventh, twelfth, thirteenth, and/or fourteenth aspect of the example method, though the example embodiments are not limited in this respect.

In a sixteenth aspect of the example method, the virtual object has a circular cross-section. In accordance with the sixteenth aspect, a distance between points in the virtual object represents a width of a display on which the bowtie view is to be displayed. In further accordance with the sixteenth aspect, the example method further comprises configuring the virtual camera to cause a field of view of the virtual camera and a field of view from a center of the circular cross-section to intersect at the points. The sixteenth aspect of the example method may be implemented in combination with the first, second, third, fourth, fifth, sixth, seventh, eighth, ninth, tenth, eleventh, twelfth, thirteenth, fourteenth, and/or fifteenth aspect of the example method, though the example embodiments are not limited in this respect.

In a seventeenth aspect of the example method, the virtual object has a circular cross-section. In accordance with the seventeenth aspect, the example method further comprises setting a field of view from a center of the circular cross-section to be in a range between 100 degrees and 120 degrees. The seventeenth aspect of the example method may be implemented in combination with the first, second, third, fourth, fifth, sixth, seventh, eighth, ninth, tenth, eleventh, twelfth, thirteenth, fourteenth, fifteenth, and/or sixteenth aspect of the example method, though the example embodiments are not limited in this respect.

In an eighteenth aspect of the example method, the virtual object has a circular cross-section. In accordance with the eighteenth aspect, the example method further comprises configuring the circular cross-section to have a diameter that is based on an aspect ratio of a display on which the bowtie view is to be displayed. The eighteenth aspect of the example method may be implemented in combination with the first, second, third, fourth, fifth, sixth, seventh, eighth, ninth, tenth, eleventh, twelfth, thirteenth, fourteenth, fifteenth, sixteenth, and/or seventeenth aspect of the example method, though the example embodiments are not limited in this respect.

In a nineteenth aspect of the example method, the virtual object has a circular cross-section. In accordance with the nineteenth aspect, the example method further comprises configuring the circular cross-section to have a diameter that is based on a width of a display on which the bowtie view is to be displayed. The nineteenth aspect of the example method may be implemented in combination with the first, second, third, fourth, fifth, sixth, seventh, eighth, ninth, tenth, eleventh, twelfth, thirteenth, fourteenth, fifteenth, sixteenth, seventeenth, and/or eighteenth aspect of the example method, though the example embodiments are not limited in this respect.

In a twentieth aspect of the example method, the example method further comprises causing a projection of the flattened image on the inner surface of the virtual object to spin with reference to the virtual camera, which causes participants of a video conference who are in a field of view of the 360-degree camera to be shown in the bowtie view as the projection spins, in response to initiation of the video conference. The twentieth aspect of the example method may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, and/or nineteenth aspect of the example method, though the example embodiments are not limited in this respect.

In a twenty-first aspect of the example method, the example method further comprises configuring a user interface to include the bowtie view and to further include avatars of participants of a video conference in a region between a lower edge of the bowtie view and a lower edge of a display on which the bowtie view is to be displayed. The twenty-first aspect of the example method may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, nineteenth, and/or twentieth aspect of the example method, though the example embodiments are not limited in this respect.

In a twenty-second aspect of the example method, the example method further comprises configuring a user interface to include the bowtie view and to further include a video stream of a participant of a video conference who is not in a field of view of the 360-degree camera, at least a portion of the video stream overlapping a region between an upper edge of the bowtie view and an upper edge of a display of a computing device of the participant on which the bowtie view is to be displayed. The twenty-second aspect of the example method may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, and/or twenty-first aspect of the example method, though the example embodiments are not limited in this respect.

An example system to provide a bowtie view of an environment comprises unwrapping logic configured to unwrap a 360-degree image of the environment that is captured by a 360-degree camera to provide a flattened image. The example system further comprises projecting logic configured to project the flattened image on an inner surface of a virtual object in a three-dimensional virtual environment. The example system further comprises a virtual camera configured to capture a portion of the flattened image from the inner surface of the virtual object to provide the bowtie view.

In a first aspect of the example system, the example system further comprises configuration logic configured to select a distance between the virtual camera and the portion of the flattened image to accommodate placement of an interface element between an upper or lower edge of the bowtie view and a respective upper or lower edge of a display on which the bowtie view is to be displayed.

In a second aspect of the example system, the example system further comprises configuration logic configured to select a distance between the virtual camera and the portion of the flattened image based on an aspect ratio of a display on which the bowtie view is to be displayed. The second aspect of the example system may be implemented in combination with the first aspect of the example system, though the example embodiments are not limited in this respect.

In a third aspect of the example system, the example system further comprises configuration logic configured to select a distance between the virtual camera and the portion of the flattened image based on a size of a display on which the bowtie view is to be displayed. The third aspect of the example system may be implemented in combination with the first and/or second aspect of the example system, though the example embodiments are not limited in this respect.

In a fourth aspect of the example system, the example system further comprises rotation logic configured to cause a projection of the flattened image on the inner surface of the virtual object to be rotatable with reference to the virtual camera by a user of a device on which the bowtie view is to be displayed. The fourth aspect of the example system may be implemented in combination with the first, second, and/or third aspect of the example system, though the example embodiments are not limited in this respect.

In a fifth aspect of the example system, the virtual camera comprises portion logic configured to select the portion from a plurality of portions of the flattened image to provide the bowtie view for display on the device based on receipt of an indicator, which specifies selection of the portion of the flattened image, from a device on which the bowtie view is to be displayed. The fifth aspect of the example system may be implemented in combination with the first, second, third, and/or fourth aspect of the example system, though the example embodiments are not limited in this respect.

In a sixth aspect of the example system, the virtual camera comprises portion logic configured to select a designated version of the portion from a plurality of versions of the portion to provide the bowtie view for display on a device based on an indicator that is received from the device specifying an attribute of the device that corresponds to the designated version. The sixth aspect of the example system may be implemented in combination with the first, second, third, fourth, and/or fifth aspect of the example system, though the example embodiments are not limited in this respect.

In a seventh aspect of the example system, the example system further comprises configuration logic that configures at least one of the virtual camera or the virtual object in real-time based on an attribute associated with a display on which the bowtie view is to be displayed. The seventh aspect of the example system may be implemented in combination with the first, second, third, fourth, fifth, and/or sixth aspect of the example system, though the example embodiments are not limited in this respect.

In an eighth aspect of the example system, the virtual object is a cylinder. In accordance with the eighth aspect, the example system further comprises configuration logic configured to position the virtual camera such that a distance between the virtual camera and the portion of the flattened image is greater than a distance between an axis that extends along the cylinder and the portion of the flattened image. The eighth aspect of the example system may be implemented in combination with the first, second, third, fourth, fifth, sixth, and/or seventh aspect of the example system, though the example embodiments are not limited in this respect.

In a ninth aspect of the example system, the virtual object is a cylinder. In accordance with the ninth aspect, the example system further comprises configuration logic configured to position the virtual camera such that a distance between the virtual camera and the portion of the flattened image is less than a diameter of the cylinder. The ninth aspect of the example system may be implemented in combination with the first, second, third, fourth, fifth, sixth, seventh, and/or eighth aspect of the example system, though the example embodiments are not limited in this respect.

In a tenth aspect of the example system, the virtual object is a cylinder. In accordance with the tenth aspect, a distance between points in the virtual object represents a width of a display on which the bowtie view is to be displayed. In further accordance with the tenth aspect, the example system further comprises configuration logic that configures the virtual camera to cause a field of view of the virtual camera and a field of view of the cylinder to intersect at the points. The tenth aspect of the example system may be implemented in combination with the first, second, third, fourth, fifth, sixth, seventh, eighth, and/or ninth aspect of the example system, though the example embodiments are not limited in this respect.

In an eleventh aspect of the example system, the virtual object is a cylinder. In accordance with the eleventh aspect, the example system further comprises view logic configured to set a field of view of the cylinder to be in a range between 100 degrees and 120 degrees. The eleventh aspect of the example system may be implemented in combination with the first, second, third, fourth, fifth, sixth, seventh, eighth, ninth, and/or tenth aspect of the example system, though the example embodiments are not limited in this respect.

In a twelfth aspect of the example system, the virtual object is a cylinder. In accordance with the twelfth aspect, the example system further comprises configuration logic that configures the cylinder to have a diameter that is based on an aspect ratio of a display on which the bowtie view is to be displayed. The twelfth aspect of the example system may be implemented in combination with the first, second, third, fourth, fifth, sixth, seventh, eighth, ninth, tenth, and/or eleventh aspect of the example system, though the example embodiments are not limited in this respect.

In a thirteenth aspect of the example system, the virtual object is a cylinder. In accordance with the thirteenth aspect, the example system further comprises configuration logic that configures the cylinder to have a diameter that is based on a width of a display on which the bowtie view is to be displayed. The thirteenth aspect of the example system may be implemented in combination with the first, second, third, fourth, fifth, sixth, seventh, eighth, ninth, tenth, eleventh, and/or twelfth aspect of the example system, though the example embodiments are not limited in this respect.

In a fourteenth aspect of the example system, the virtual object has a circular cross-section. In accordance with the fourteenth aspect, the example system further comprises configuration logic configured to position the virtual camera such that a distance between the virtual camera and the portion of the flattened image is greater than a radius of the circular cross-section. The fourteenth aspect of the example system may be implemented in combination with the first, second, third, fourth, fifth, sixth, seventh, eighth, ninth, tenth, eleventh, twelfth, and/or thirteenth aspect of the example system, though the example embodiments are not limited in this respect.

In a fifteenth aspect of the example system, the virtual object has a circular cross-section. In accordance with the fifteenth aspect, the example system further comprises configuration logic configured to position the virtual camera such that a distance between the virtual camera and the portion of the flattened image is less than a diameter of the circular cross-section. The fifteenth aspect of the example system may be implemented in combination with the first, second, third, fourth, fifth, sixth, seventh, eighth, ninth, tenth, eleventh, twelfth, thirteenth, and/or fourteenth aspect of the example system, though the example embodiments are not limited in this respect.

In a sixteenth aspect of the example system, the virtual object has a circular cross-section. In accordance with the sixteenth aspect, a distance between points in the virtual object represents a width of a display on which the bowtie view is to be displayed. In further accordance with the sixteenth aspect, the example system further comprises configuration logic that configures the virtual camera to cause a field of view of the virtual camera and a field of view from a center of the circular cross-section to intersect at the points. The sixteenth aspect of the example system may be implemented in combination with the first, second, third, fourth, fifth, sixth, seventh, eighth, ninth, tenth, eleventh, twelfth, thirteenth, fourteenth, and/or fifteenth aspect of the example system, though the example embodiments are not limited in this respect.

In a seventeenth aspect of the example system, the virtual object has a circular cross-section. In accordance with the seventeenth aspect, the example system further comprises view logic configured to set a field of view from a center of the circular cross-section to be in a range between 100 degrees and 120 degrees. The seventeenth aspect of the example system may be implemented in combination with the first, second, third, fourth, fifth, sixth, seventh, eighth, ninth, tenth, eleventh, twelfth, thirteenth, fourteenth, fifteenth, and/or sixteenth aspect of the example system, though the example embodiments are not limited in this respect.

In an eighteenth aspect of the example system, the virtual object has a circular cross-section. In accordance with the eighteenth aspect, the example system further comprises configuration logic that configures the circular cross-section to have a diameter that is based on an aspect ratio of a display on which the bowtie view is to be displayed. The eighteenth aspect of the example system may be implemented in combination with the first, second, third, fourth, fifth, sixth, seventh, eighth, ninth, tenth, eleventh, twelfth, thirteenth, fourteenth, fifteenth, sixteenth, and/or seventeenth aspect of the example system, though the example embodiments are not limited in this respect.

In a nineteenth aspect of the example system, the virtual object has a circular cross-section. In accordance with the nineteenth aspect, the example system further comprises configuration logic that configures the circular cross-section to have a diameter that is based on a width of a display on which the bowtie view is to be displayed. The nineteenth aspect of the example system may be implemented in combination with the first, second, third, fourth, fifth, sixth, seventh, eighth, ninth, tenth, eleventh, twelfth, thirteenth, fourteenth, fifteenth, sixteenth, seventeenth, and/or eighteenth aspect of the example system, though the example embodiments are not limited in this respect.

In a twentieth aspect of the example system, the example system further comprises rotation logic configured to cause a projection of the flattened image on the inner surface of the virtual object to spin with reference to the virtual camera to cause participants of a video conference who are in a field of view of the 360-degree camera to be shown in the bowtie view as the projection spins in response to initiation of the video conference. The twentieth aspect of the example system may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, and/or nineteenth aspect of the example system, though the example embodiments are not limited in this respect.

In a twenty-first aspect of the example system, the example system further comprises interface logic configured to provide a user interface that includes the bowtie view and that further includes avatars of participants of a video conference in a region between a lower edge of the bowtie view and a lower edge of a display on which the bowtie view is to be displayed. The twenty-first aspect of the example system may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, nineteenth, and/or twentieth aspect of the example system, though the example embodiments are not limited in this respect.

In a twenty-second aspect of the example system, the example system further comprises interface logic configured to provide a user interface that includes the bowtie view and that further includes a video stream of a participant of a video conference who is not in a field of view of the 360-degree camera, at least a portion of the video stream overlapping a region between an upper edge of the bowtie view and an upper edge of a display of a computing device of the participant on which the bowtie view is to be displayed. The twenty-second aspect of the example system may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, and/or twenty-first aspect of the example system, though the example embodiments are not limited in this respect.

An example computer program product comprises a computer-readable storage medium having computer program logic recorded thereon for enabling a processor-based system to provide a bowtie view of an environment. The computer program logic comprises first program logic for enabling the processor-based system to unwrap a 360-degree image of the environment that is captured by a 360-degree camera to provide a flattened image. The computer program logic further comprises second program logic for enabling the processor-based system to project the flattened image on an inner surface of a virtual object in a three-dimensional virtual environment. The computer program logic further comprises third program logic for enabling the processor-based system to capture a portion of the flattened image from the inner surface of the virtual object using a virtual camera to provide the bowtie view.

IV. Example Computer System

Figure 8:
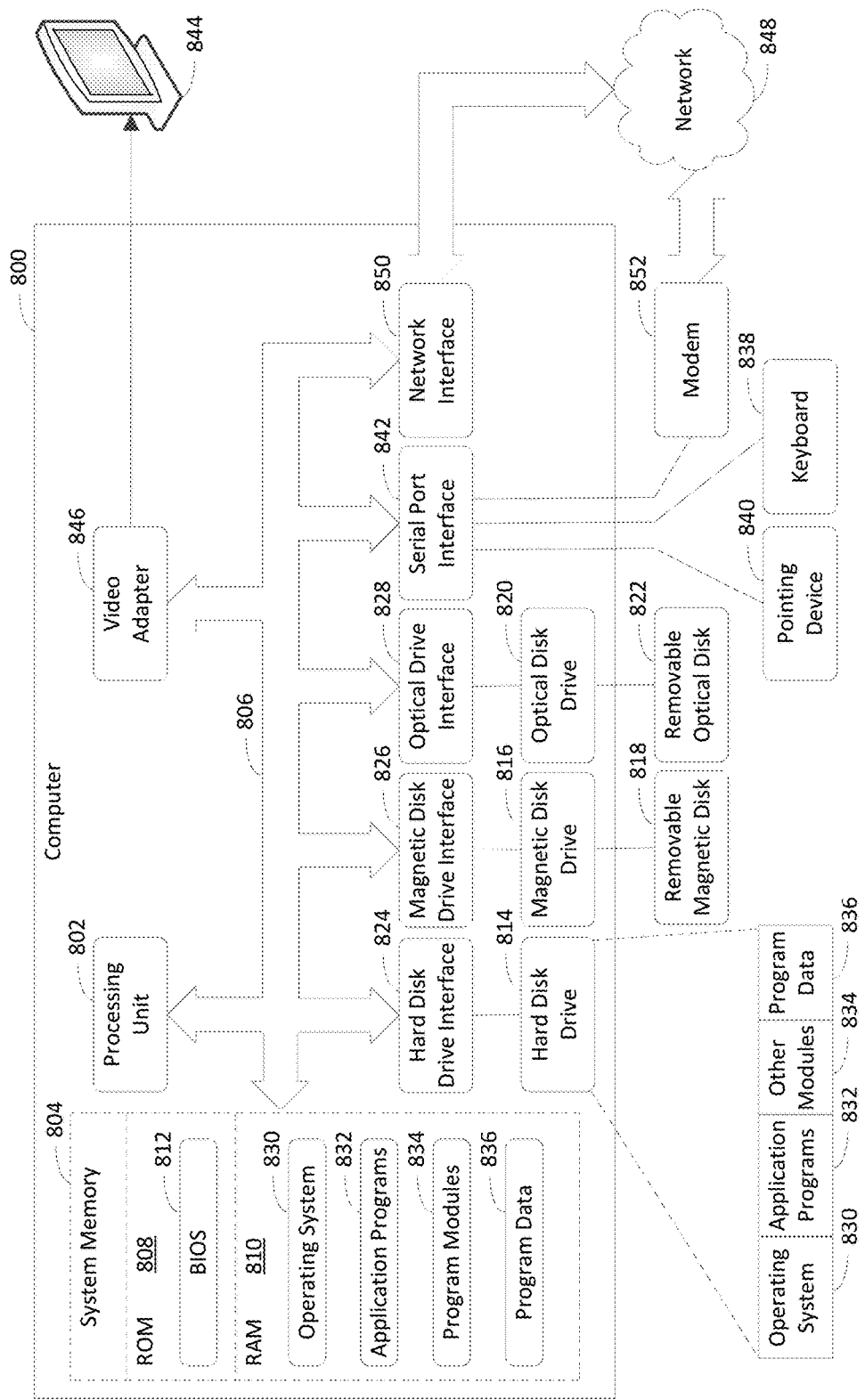
FIG. 8 depicts an example computer in which embodiments may be implemented.

FIG. 8 depicts an example computer 800 in which embodiments may be implemented. Any one or more of remote computing devices 106A-106N and/or local computing device 102 shown in FIG. 1; computing device 400 shown in FIG. 4; and/or any one or more of computing device(s) 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of remote bowtie view logic 128A-128N, local bowtie view logic 118, bowtie view logic 706, unwrapping logic 708, projecting logic 710, virtual camera 712, configuration logic 714, rotation logic 716, view logic 718, interface logic 720, portion logic 722, and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a memory; and
one or more processors coupled to the memory and configured to:
unwrap a 360-degree image of an environment that is captured by a 360-degree camera to provide a flattened image;
project the flattened image on an inner surface of a virtual object in a three-dimensional virtual environment;
capture a projected portion of the flattened image from the inner surface of the virtual object using a virtual camera; and
generate a bowtie view using the projected portion of the flattened image that is captured from the inner surface of the virtual object, the bowtie view being compressed at its center such that at least one side of the bowtie view is concave.

2. The system of claim 1, wherein the one or more processors are configured to select a distance between the virtual camera and the projected portion of the flattened image that corresponds to the bowtie view on the inner surface of the virtual object to accommodate placement of an interface element between an upper or lower edge of the bowtie view and a respective upper or lower edge of a display on which the bowtie view is to be displayed.

3. The system of claim 1, wherein the one or more processors are configured to select a distance between the virtual camera and the projected portion of the flattened image that corresponds to the bowtie view on the inner surface of the virtual object based on an aspect ratio of a display on which the bowtie view is to be displayed.

4. The system of claim 1, wherein the one or more processors are configured to select a distance between the virtual camera and the projected portion of the flattened image that corresponds to the bowtie view on the inner surface of the virtual object based on a size of a display on which the bowtie view is to be displayed.

5. The system of claim 1, wherein the one or more processors are configured to cause a projection of the flattened image on the inner surface of the virtual object to be rotatable with reference to the virtual camera by a user of a device on which the bowtie view is to be displayed.

6. The system of claim 1, wherein the one or more processors are configured to configure at least one of the virtual camera or the virtual object in real-time based on an attribute associated with a display on which the bowtie view is to be displayed.

7. The system of claim 1, wherein the virtual object has a circular cross-section; and
wherein the one or more processors are configured to position the virtual camera such that a distance between the virtual camera and the projected portion of the flattened image that corresponds to the bowtie view on the inner surface of the virtual object is greater than a radius of the circular cross-section.

8. The system of claim 1, wherein the virtual object has a circular cross-section; and
wherein the one or more processors are configured to position the virtual camera such that a distance between the virtual camera and the projected portion of the flattened image that corresponds to the bowtie view on the inner surface of the virtual object is less than a diameter of the circular cross-section.

9. The system of claim 1, wherein the virtual object has a circular cross-section;
wherein a distance between points in the virtual object represents a width of a display on which the bowtie view is to be displayed; and
wherein the one or more processors are configured to configure the virtual camera to cause a field of view of the virtual camera and a field of view from a center of the circular cross-section to intersect at the points.

10. The system of claim 1, wherein the virtual object has a circular cross-section; and
wherein the one or more processors are configured to configure the circular cross-section to have a diameter that is based on an aspect ratio of a display on which the bowtie view is to be displayed.

11. The system of claim 1, wherein the virtual object has a circular cross-section; and
wherein the one or more processors are configured to configure the circular cross-section to have a diameter that is based on a width of a display on which the bowtie view is to be displayed.

12. The system of claim 1, wherein the one or more processors are configured to cause a projection of the flattened image on the inner surface of the virtual object to spin with reference to the virtual camera to cause participants of a video conference who are in a field of view of the 360-degree camera to be shown in the bowtie view as the projection spins in response to initiation of the video conference.

13. A method comprising:
unwrapping a 360-degree image of an environment that is captured by a 360-degree camera to provide a flattened image;
projecting the flattened image on an inner surface of a virtual object in a three-dimensional virtual environment;
capturing a projected portion of the flattened image on the inner surface of the virtual object using a virtual camera; and
generating a bowtie view using the projected portion of the flattened image that is captured from the inner surface of the virtual object, the bowtie view being compressed at its center such that at least one side of the bowtie view is concave.

14. The method of claim 13, further comprising:
receiving an indicator, which specifies selection of a portion of the flattened image that corresponds to the bowtie view, from a device on which the bowtie view is to be displayed;
selecting the portion from a plurality of portions of the flattened image based on receipt of the indicator; and
providing the bowtie view for display on the device based on selection of the portion from the plurality of portions of the flattened image.

15. The method of claim 13, further comprising:
receiving an indicator from a device on which the bowtie view is to be displayed, the indicator specifying an attribute of the device;
selecting a version of the projected portion of the flattened image from a plurality of versions of the projected portion based on the attribute that is specified by the indicator; and
providing the bowtie view for display on the device based on selection of the version of the projected portion from the plurality of versions of the projected portion.

16. The method of claim 13, further comprising:
configuring at least one of the virtual camera or the virtual object in real-time based on an attribute associated with a display on which the bowtie view is to be displayed.

17. The method of claim 13, wherein the virtual object is a cylinder; and
wherein the method further comprises:
positioning the virtual camera such that a distance between the virtual camera and the projected portion of the flattened image that corresponds to the bowtie view on the inner surface of the cylinder is greater than a distance between an axis that extends along the cylinder and the projection of the portion of the flattened image on the inner surface of the cylinder.

18. The method of claim 13, wherein the virtual object is a cylinder; and
wherein the method further comprises:
positioning the virtual camera such that a distance between the virtual camera and the projected portion of the flattened image that corresponds to the bowtie view on the inner surface of the cylinder is less than a diameter of the cylinder.

19. The method of claim 13, wherein the virtual object is a cylinder;
wherein a distance between points in the virtual object represents a width of a display on which the bowtie view is to be displayed; and
wherein the method further comprises:
configuring the virtual camera to cause a field of view of the virtual camera and a field of view of the cylinder to intersect at the points.

20. The method of claim 13, wherein the virtual object is a cylinder; and
  wherein the method further comprises:
    configuring the cylinder to have a diameter that is based on an aspect ratio of a display on which the bowtie view is to be displayed.

21. The method of claim 13, wherein the virtual object is a cylinder; and
  wherein the method further comprises:
    configuring the cylinder to have a diameter that is based on a width of a display on which the bowtie view is to be displayed.

22. The method of claim 13, further comprising:
  configuring a user interface to include the bowtie view and to further include avatars of participants of a video conference in a region between a lower edge of the bowtie view and a lower edge of a display on which the bowtie view is to be displayed.

23. The method of claim 13, further comprising:
  configuring a user interface to include the bowtie view and to further include a video stream of a participant of a video conference who is not in a field of view of the 360-degree camera, at least a portion of the video stream overlapping a region between an upper edge of the bowtie view and an upper edge of a display of a computing device of the participant on which the bowtie view is to be displayed.

24. A computer program product comprising a computer-readable storage medium having computer program logic recorded thereon for enabling a processor-based system to provide a bowtie view of an environment, the computer program logic comprising:
  means for enabling the processor-based system to unwrap a 360-degree image of the environment that is captured by a 360-degree camera to provide a flattened image;
  means for enabling the processor-based system to project the flattened image on an inner surface of a virtual object in a three-dimensional virtual environment;
  means for enabling the processor-based system to capture a projected portion of the flattened image from the inner surface of the virtual object using a virtual camera; and
  means for enabling the processor-based system to generate a bowtie view using the projected portion of the flattened image that is captured from the inner surface of the virtual object, the bowtie view being compressed at its center such that at least one side of the bowtie view is concave.

* * * * *